US011056712B2

(12) United States Patent
Darolles et al.

(10) Patent No.: US 11,056,712 B2
(45) Date of Patent: Jul. 6, 2021

(54) VERTICAL CARBON NANOTUBE AND LITHIUM ION BATTERY CHEMISTRIES, ARTICLES, ARCHITECTURES AND MANUFACTURE

(71) Applicant: CALIFORNIA INSTITUTE OF TECHNOLOGY, Pasadena, CA (US)

(72) Inventors: Isabelle M. Darolles, Los Angeles, CA (US); Azin Fahimi, Pasadena, CA (US); Cong Wang, Pasadena, CA (US); Adrianus I. Aria, Cambridge (GB); Luciana Cendon, San Dimas, CA (US); Morteza Gharib, Altadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 71 days.

(21) Appl. No.: 15/411,544

(22) Filed: Jan. 20, 2017

(65) Prior Publication Data

US 2017/0214083 A1 Jul. 27, 2017

Related U.S. Application Data

(60) Provisional application No. 62/308,740, filed on Mar. 15, 2016, provisional application No. 62/287,497, (Continued)

(51) Int. Cl.
*H01M 10/0525* (2010.01)
*H01M 4/66* (2006.01)
(Continued)

(52) U.S. Cl.
CPC ......... *H01M 10/0525* (2013.01); *H01M 4/13* (2013.01); *H01M 4/38* (2013.01);
(Continued)

(58) Field of Classification Search
CPC .......... H01M 4/13; H01M 4/38; H01M 4/386; H01M 4/662; H01M 4/663; H01M 4/664;
(Continued)

(56) References Cited

U.S. PATENT DOCUMENTS

2002/0073534 A1* 6/2002 Kurosaki ............. H01M 4/137
29/623.5
2006/0121342 A1 6/2006 Sano et al.
(Continued)

FOREIGN PATENT DOCUMENTS

CN 102891335 1/2013
CN 105218992 1/2016
(Continued)

OTHER PUBLICATIONS

English translation of WO Publication 2015-152499, Oct. 2015.*
(Continued)

*Primary Examiner* — Brittany L Raymond
(74) *Attorney, Agent, or Firm* — One LLP (57) ABSTRACT

Features for rechargeable lithium ion batteries, the batteries optionally employing vertically aligned carbon nanotube scaffolding, are described. Methods of manufacture and a solid polymer electrolyte are described for 3-dimensional battery architectures using the vertically aligned carbon
(Continued)

nanotubes. Poly(ethylene)oxide bis(azide) and graphene poly(lactic acid) composite coatings are also described for use in such batteries or others.

9 Claims, 8 Drawing Sheets

Related U.S. Application Data filed on Jan. 27, 2016, provisional application No. 62/286,083, filed on Jan. 22, 2016, provisional application No. 62/286,075, filed on Jan. 22, 2016.

(51) Int. Cl.
*H01M 4/38* (2006.01)
*H01M 10/0565* (2010.01)
*H01M 10/0585* (2010.01)
*H01M 4/13* (2010.01)

(52) U.S. Cl.
CPC ........... *H01M 4/386* (2013.01); *H01M 4/662* (2013.01); *H01M 4/663* (2013.01); *H01M 4/664* (2013.01); *H01M 4/665* (2013.01); *H01M 10/0565* (2013.01); *H01M 10/0585* (2013.01); *Y02T 10/70* (2013.01)

(58) Field of Classification Search
CPC ............. H01M 4/665; H01M 10/0525; H01M 10/0565; H01M 10/0585
See application file for complete search history.

(56) References Cited

U.S. PATENT DOCUMENTS

| | | | | |
|---|---|---|---|---|
| 2009/0246625 | A1* | 10/2009 | Lu | H01M 4/133 429/207 |
| 2011/0223467 | A1* | 9/2011 | Shacklette | H01M 2/204 429/160 |
| 2013/0157122 | A1 | 6/2013 | Tsai et al. | |
| 2014/0093769 | A1 | 4/2014 | Busnaina et al. | |
| 2015/0010788 | A1 | 1/2015 | Aria et al. | |
| 2015/0346573 | A1* | 12/2015 | Theiste | G02F 1/1506 429/188 |
| 2016/0336618 | A1* | 11/2016 | Lee | H01M 10/0565 |

FOREIGN PATENT DOCUMENTS

| | | |
|---|---|---|
| JP | H10-265674 | 10/1998 |
| JP | 2012-119236 | 6/2012 |
| KR | 10-2013-0102849 | 9/2013 |
| WO | WO 2015-152499 | * 10/2015 |

OTHER PUBLICATIONS

WO, PCT/US2017/014359 ISR and Written Opinion, dated May 25, 2017.
JP, 2018-525660 Office Action, dated Sep. 8, 2020.
CN, 201780007175.7 First Office Action, dated Aug. 5, 2020.
IN, 201817018819 Examination Report, dated Dec. 9, 2020.

* cited by examiner

VERTICAL CARBON NANOTUBE AND LITHIUM ION BATTERY CHEMISTRIES, ARTICLES, ARCHITECTURES AND MANUFACTURE

CROSS-REFERENCE TO RELATED APPLICATIONS

This filing claims the benefit of and priority to U.S. Provisional Application No. 62/286,075 filed Jan. 22, 2016, U.S. Provisional Application No. 62/286,083 filed Jan. 22, 2016, U.S. Provisional Application No. 62/287,497 filed Jan. 27, 2016, and U.S. Provisional Application No. 62/308,740 filed Mar. 15, 2016, all of which are incorporated by reference herein in their entireties for all purposes.

FIELD

This disclosure relates to lithium ion (Li-ion) electrochemical cells (i.e., batteries), particularly secondary (i.e., rechargeable) Li-ion batteries (LiBs).

BACKGROUND

LIBs have been a prominent means of storing electrical energy. Among secondary batteries, LIBs offer several notable advantages such as high volume and gravimetric energy density, long shelf life and a boarder temperature range of operation. The commercialization of LIBs has enabled the realization of laptop computers and high performance smart phones.

Most of the current commercial Li-ion batteries are based on the combination of lithium containing transition metal oxides as positive electrodes or cathodes, and carbonaceous materials (especially graphite) as negative electrodes or anodes. So-constructed, the specific energy of existing LIBs is still insufficient for many applications such as electric vehicles, plug-in hybrid electric vehicles, and smart grid community systems due to the limited specific charge capacity of the electrode materials.

In order to significantly improve energy density of the LIBs, use of a silicon anode and a $Li_2S$ cathode has been envisioned. Silicon has a theoretical charge capacity of 4,200 mAh/g which is more than ten times higher than the current graphite anode which has a theoretical capacity of 372 mAh/g. Due to its abundance, low cost, and high theoretical capacity, sulfur-based materials has been considered as one of the most promising cathode. When compared to toxic transition-metal compounds, sulfur is considered more environmentally friendly as well.

A silicon anode and $Li_2S$ cathode chemistry yields a LIB with a theoretical specific energy of 1550 Wh/kg, which is four times that of the theoretical specific energy of existing LIBs. Nevertheless, sulfur cathodes and silicon anodes have shortcomings that have prevented their practical application.

A major drawback sulfur use is the formation during charge-discharge cycle of highly soluble polysulfides species in liquid electrolytes. The result is in the so-called "shuttle effect" that removes active material from the positive sulfur electrode and also damages or deactivates anode surface area. Moreover, sulfur-based batteries have low electronic conductivity with associated inefficiencies.

A disadvantage of silicone anode use is the large volume change (>400%) that occurs upon cycling. This issue causes fractures, cracks and disconnection of silicon from current collector, leading to loss of capacity during cycling. In addition, the volume change also causes the irreversible and continuous formation of a solid electrolyte interface (SEI) film. This surface film passivates the anode surface and prevents further decomposition of the electrolyte solution. However, high volume changes experienced by silicon during electrochemical cycling can continuously weaken and fracture the SEI layer, exposing fresh silicon to the electrolyte with each cycle.

Efforts at protecting the active material from pulverization upon lithiation/delithiation the nano structure (e.g., nanowire) support has proven effective in that regard. However, such action increases the problem related to the constant breaking/re-forming of the SEI upon cycling due to the increased surface area of the nanostructured materials. It has been suggested that a thin carbon layer coated on the silicon particles could enhance the mechanical stability of the SEI and improve the anode lifetime. However, the formation of a thin layer of carbon requires high temperature annealing leading to the formation of silicon carbide, making a fraction of silicon inactive.

No overall solution has been identified to date. Rather, the issues noted above have variously limited silicon anode and sulfur cathode LIBs such that they currently suffer rapid capacity fading, poor cycle life, low system efficiency and/or large internal resistance.

It is also known that LIBs can present a safety issues. Especially when more and more energy is packed into a cell (as with a silicon anode and sulfur cathode chemistry), safety becomes a priority. Many LIBs currently use organic solvent electrolytes which are volatile and flammable. Thus, if the cell is overheated due to overcharging, internal shorting, physical damage, or other failure mechanisms, it may undergo thermal runaway that can result in serious hazards of fire and explosion. Attempts to improve the safety of these electrolytes have focused on creating solid-state batteries using polymer or ceramic/glass solid electrolytes.

The most promising results have been obtained with systems based on blends between poly(ethylene oxide) and Li salts. However, these materials have very poor ionic conductivities which has limited their viability. Addition of ionic liquids or ceramic fillers to the polymer electrolyte has shown significant enhancement of ionic conductivity. Although, conductivity values as high as 5×10−4 S/cm have been achieved at room temperature, this remains too low to compete with liquid electrolytes, thus limiting their application to high temperature operations. Also, the increase of ionic conductivity often results in decreasing mechanical properties of the polymer electrolyte.

The embodiments hereof variously address the aforementioned performance and/or safety considerations. As such, they present advantages as stated or as will be appreciated by those with skill in the art in view of the below.

SUMMARY

A first set of embodiments involves a solid polymer electrolyte for three-dimensional (3D) battery architectures. The polymer electrolyte is a combination of a functionalized poly(ethylene) oxide or poly(ethylene glycol) as poly(ethylene) oxide is referred to when its molecular weight is below 20,000 g/mol (either way, PEG), a lithium salt, an ionic liquid, and graphene oxide as filler. The so-called "3D" batteries may share their architecture with those described in US Patent Publication Number (USPPN) 2015/0010788 which are incorporated herein by reference.

Other architectures and/or associated methods of manufacture as detailed below may be used as well. These embodiments may also utilize or share the Silicon and Sulfur (i.e., Si/S) and other associated chemistry described in the '788 publication also incorporated herein by reference.

However configured, the polymer electrolyte serves several key roles or functions in the system. Namely, it provides a means for the following, either alone or in combination depending on the embodiment, to provide superior battery performance: (1) Li-ion transport between anode and cathode; (2) a physical barrier between electrodes avoiding anode and cathode contact (otherwise resulting in electrical path shorting); (3) insuring safety of the battery as the polymer electrolyte does not contain volatile and flammable organic solvents; (4) accommodating volume change of electrode by buffering stress and strain of electrodes; (5) preventing polysulfide dissolution and a polysulfide shuttle mechanism; and (6) forming a stable SEI on anode surface with the polymer possibly bonding to and thereby stabilizing Si surface(s).

A second set of embodiments involves fabrication methods or processes for 3D battery production. In one method, a microscale polymer structure is fabricated to separate interlaced or interleaved anode and cathode (i.e., negative electrode and positive electrode) current collector structures. Placement of the interposed micro-structure polymer element(s) avoids electrical shorting.

In another method, a dimensionally stable ceramic substrate is produced in order to provide interlaced or interleaved anode and cathodes upon application of a conductive growth substrate (e.g., Nickel) thereon for vertically-aligned carbon nanotube (VACNT) growth. Once electrically active material is incorporated and/or deposited on the VACNTs, a cell can be assembled without electrical shorting (with or without the aforementioned micro-structure insulation), with remaining gaps filled with a liquid or solid electrolyte.

A third set of embodiments involves compositions and methods using poly(ethylene)oxide bis(azide) (PEO-N3) to form a stable SEI during cycling of the silicon anode. With high Li ion conductivity and good bonding to the silicon surface(s), the polymer layer will protect the silicon while allowing good battery performance. Specifically, the thin layer (e.g., from between about 10 nm to about 100 nm) offers low resistivity (e.g., from about 103 to about 104 $\Omega \cdot cm$) so battery performance is largely unaffected, while the polymer effectively prevents electrolyte decomposition. These embodiments are advantageously employed in connection with a VACNT architecture—whether employed in a 3D arrangement as further elaborated upon below or a 2 dimensional (2D) arrangement.

A fourth set of embodiments involves compositions and methods in which a graphene poly(lactic acid) (PLA) composite covers the cells' cathode and/or anode material. As with the third set of embodiments, these are advantageously employed in connection with a VACNT architecture—whether employed in a 2D or 3D arrangement.

The subject chemistries, architectures, half cells and/or individual or unit cells constructed therefrom, groups of cells, kits in which they are included (with and without assembly), methods of use and manufacture are all included within the scope of the present disclosure. Some aspects of the same are described above, and more detailed discussion is presented in connection with the figures below. Other systems, devices, methods, features and advantages of the subject matter described herein will be or will become apparent to one with skill in the art upon examination of the following figures and Detailed Description.

It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Various examples or embodiments are described below. Reference is made to these examples in a non-limiting sense, as it should be noted that they are provided to illustrate more broadly applicable aspects of the devices, systems and methods. Various changes may be made to these embodiments and equivalents may be substituted without departing from the true spirit and scope of the various embodiments. In addition, many modifications may be made to adapt a particular situation, material, composition of matter, process, process act(s) or step(s) to the objective(s), spirit or scope of the present invention. All such modifications are intended to be within the scope of the present disclosure.

Before the present subject matter is described in detail, it is to be understood that this disclosure is not limited to the particular example embodiments described, as such may, of course, vary. It is also to be understood that the terminology used herein is for the purpose of describing particular embodiments only, and is not intended to be limiting, since the scope of the present disclosure will be limited only by the appended claims.

All features, elements, components, functions, acts and steps described with respect to any embodiment provided herein are intended to be freely combinable and substitutable with those from any other embodiment. If a certain feature, element, component, function, or step is described with respect to only one embodiment, then it should be understood that that feature, element, component, function, act or step can be used with every other embodiment described herein unless explicitly stated or otherwise impossible. This paragraph therefore serves as antecedent basis and written support for the introduction of claims, at any time, that combine features, elements, components, functions, acts and steps from different embodiments, or that substitute features, elements, components, functions, acts and steps from one embodiment with those of another, even if the following description does not explicitly state, in a particular instance, that such combinations or substitutions are possible. Conversely, the claims may be drafted to exclude any optional element (e.g., any element not indicated as critical above). As such, this statement is intended to serve as antecedent basis for use of such exclusive terminology as "solely," "only" and the like in connection with the recitation of claim elements, or use of any other type of "negative" limitation directly or by implication through use of the term "consisting" regarding any given element. Express recitation of every possible combination and substitution or elimination is overly burdensome and hereby covered.

First Set of Embodiments

In the first set of embodiments summarized above, a "high performance" polymer electrolyte in described for use in conjunction with a 3D battery architecture that may be based on a Si/S LIB battery chemistry. The polymer electrolyte is a combination of a functionalized poly(ethylene glycol) (PEG), a lithium salt, an ionic liquid, and graphene oxide as filler.

The overall combination exploits the advantageous energy characteristics of silicon and sulfur while also taking lifetime and cost issues into account. Moreover, the polymer electrolyte provides safety due to the absence of toxic and unstable materials, as well as the absence of flammable organic solvents.

Figure 1A:
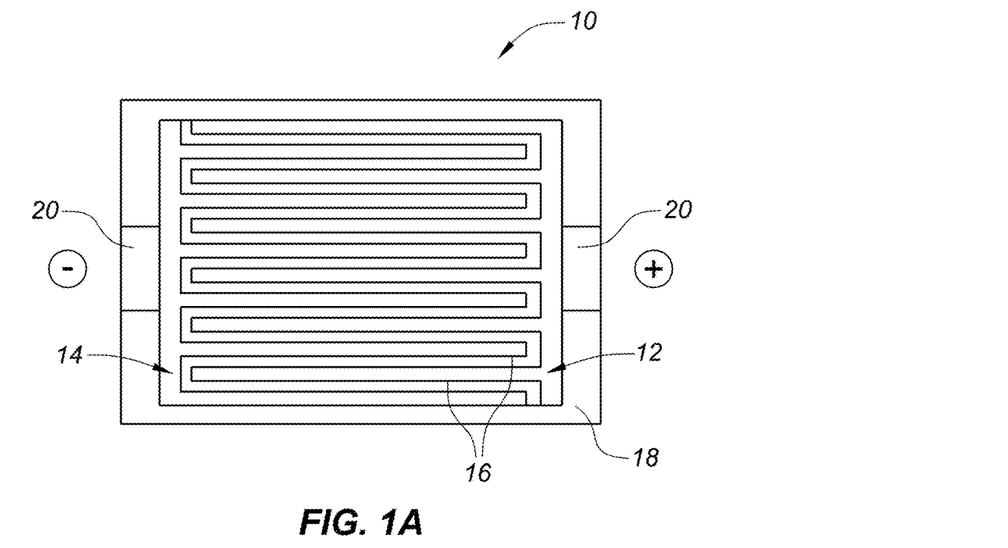
FIGS. 1A-1C are top, side and perspective views of a 3D battery architecture embodiment.
Figure 1B:
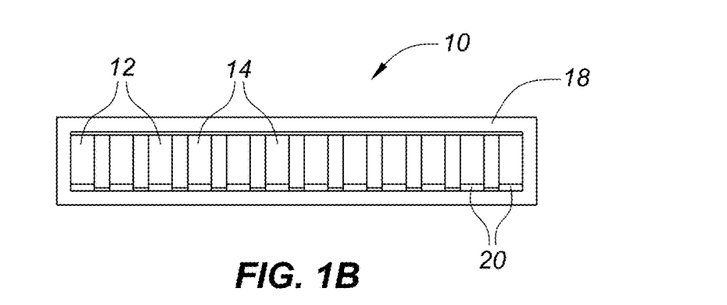
Figure 1C:
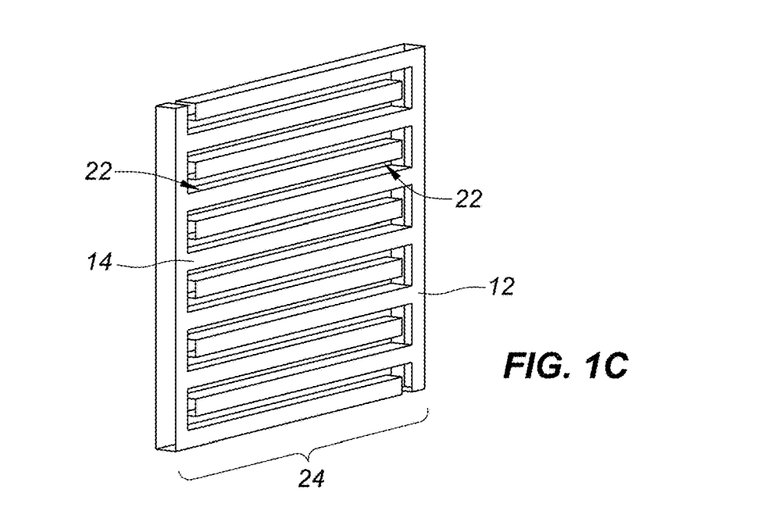

FIGS. 1A-1C illustrate a basic configuration of a 3D Si/S battery 10 using a polymer electrolyte. The cathode 12 and anode 14 are patterned in a comb-type configuration with comb "teeth" or alternating "fingers" such that both electrode elements (i.e., anode and cathode) are in the same plane when assembled in an interlaced fashion. The polymer electrolyte 16 fills the space between the electrode surfaces (along with any optional micro-structure insulating features as referenced below.)

In a full or complete assembly as shown in FIGS. 1A and 1B, these elements are housed or set within a casing 18 and may further include current collector portions 20 upon which VNCTs are set (in this context, "set" means grown, adhered or otherwise attached thereto).

As shown, the electrodes are interlaced within the same plane. Alternatively, they may be setup opposite to or facing one another.

The former arrangement places the electrode 12 and 14 surfaces or elements very close to each other when interfit, thus reducing ion diffusion lengths or distances. The interposed polymer electrolyte 16 insures Li ion transport in between anode and cathode, and acts a physical barrier between the electrodes elements.

Figure 2A:
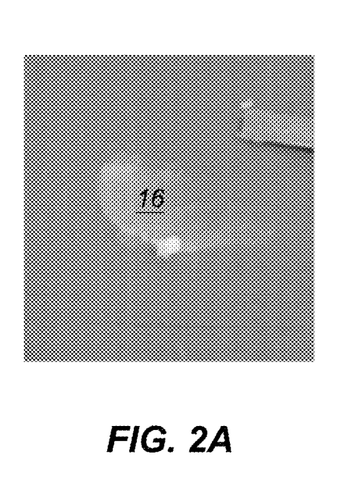
FIGS. 2A and 2B are electrolyte for the FIG. 1A-1C embodiment in paste and as-cured solid form, respectively.

The electrolyte comprises or (optionally) consists of a combination of a functionalized poly(ethylene glycol) (PEG), a lithium salt, an ionic liquid, and graphene oxide as filler. Electrolyte 16 is prepared as a paste at room temperature as shown in FIG. 2A. It can be introduced in the channels 22 of a 3D architecture in this slurry or paste form. It is then cured or otherwise hardened to a solid state of matter.

Figure 2B:
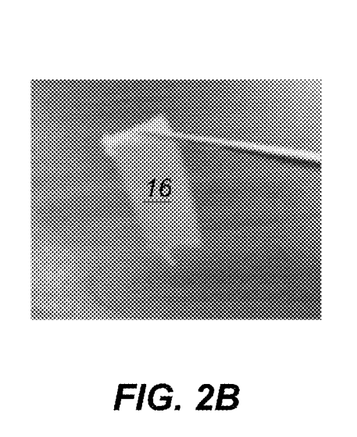

After cross-linking, the composition develops its intended mechanical properties converting from a paste to a state capable of performing as a stretchable free-standing film. Outside the channels in a battery, this can be seen in FIG. 2B.

The process of preparation of the polymer electrolyte and its incorporation to electrodes system may be accomplished without the use of organic solvents. Once the subject electrodes are assembled into a mold, the polymer electrolyte can be incorporated.

In one example, all the compounds are mixed together at about 60° C. or more (e.g., up to about 80° C. as a maximum at which the azide function of optionally associated components elaborated upon below start to decompose) until the mixture is homogeneous (i.e., utilizing the low melting temperature of poly(ethylene glycol) of less than about 60° C.). The mixture is then poured on top of electrode system 24 seen in FIG. 1C.

Because of its fluidity at temperature of at least about 60° C., the polymer electrolyte mixture is able infuse into the electrodes system. This process may be performed under vacuum or inert (e.g., noble gas or $N_2$) atmosphere.

Figure 3:
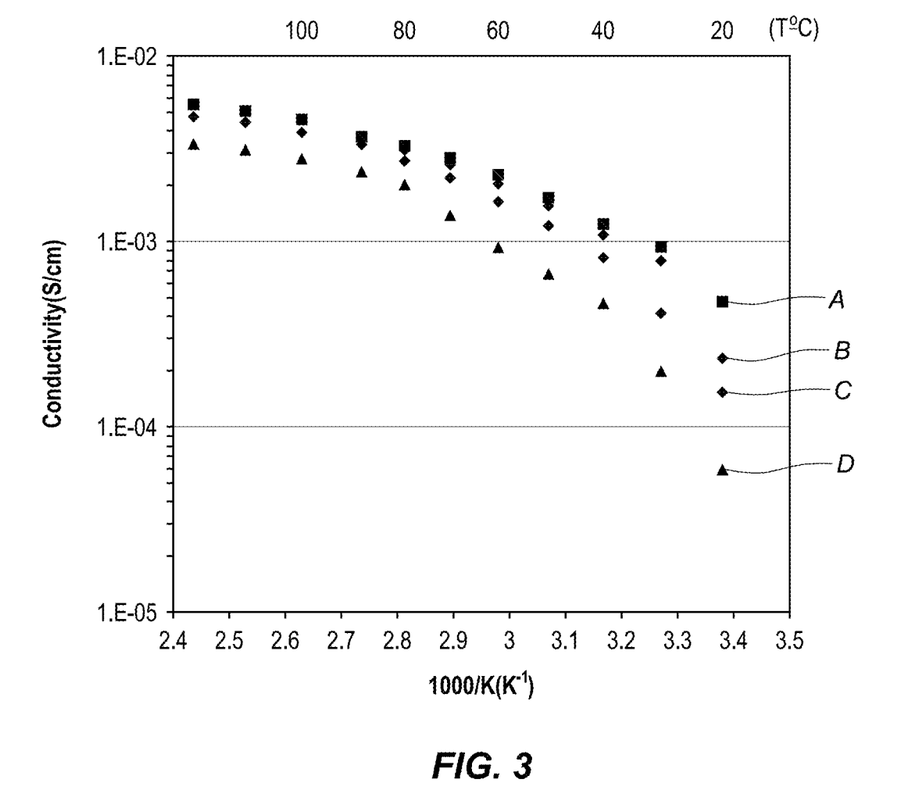
FIG. 3 is a graph comparing the conductivity of solid polymer electrolyte embodiments.

The polymer electrolyte is subsequently cured. Curing by ultraviolet (UV) light, furnace or oven heat and/or microwave energy leads to the cross-linking of the polymer and a significant increase of mechanical strength. The mechanical properties (e.g., flexibility, elastic and/or deformability) of the polymer electrolyte can be optimized by varying the components ratios. Example compounds include PEOy-LiTFSIxBMPTFSI with y molar ratio EO/Li and x molar ratio BMP/Li where PEO=Poly(ethylene) oxide, LiTFSI=Bis(trifluoromethylsulfonyl) lithium salt and BMPTFI (ionic liquid)=1-Butyl-1-Methylpyrrolidinium Bis (trifluoromethylsulfonyl)imide and Y can vary from 10 to 20 and x from 0 to 4. With x=0 the polymer electrolyte film is non sticky, stiff and not stretchable. Examples of such compounds tested for conductivity as presented in FIG. 3 are represented in the table below:

TABLE 1

| Example | $PEO_y LiTFSI_x BMPTFSI$ Compositions | Properties after UV Crosslinking |
| --- | --- | --- |
| A | $PEO_{15} LiTFSI_2 BMPTFSI$ | clear, stretchable, moderately tacky |
| B | $PEO_{16} LiTFSI_2 BMPTFSI$ | clear, stretchable, moderately tacky |
| C | $PEO_{17} LiTFSI_2 BMPTFSI$ | clear, stretchable, slightly tacky |
| D | $PEO_{20} LiTFSI_2 BMPTFSI$ | clear, stretchable, not tacky |

In any case, the selected materials work together in synergy. Namely, upon curing, the functional groups of PEG undergo crosslinking that results in a significant increase of mechanical properties (per above). The incorporation of different combinations of salts (e.g., per above) and/or ionic liquid (e.g., 1-ethyl-3-methylimidazolium bis(trifluoromethanesulfonyl)imide (EMI-TFSI), N-methyl,N-propylpiperidinium bis(trifluoromethanesulfonyl)imide (MPP-TFSI), N-butyl, N-propylpyrrolidinium bis(trifluoromethanesulfonyl)imide (BMP-TFSI), N-butyl, N-propylpyrrolidinium tris(pentafluoroethyl)trifluorophosphate (BMP-FAP) and N-butyl, N-propylpyrrolidinium bis(fluorosulfonyl)imide (BMP-FSI) and/or as presented in USPPN 20150380767 incorporated by reference herein in its entirety) significantly enhances significantly the ionic conductivity of the polymer electrolyte. Graphene oxide (GO) sheets have superior mechanical properties and strongly interact with PEG increasing the tensile strength of the polymer electrolyte. Additionally, GO oxygen groups facilitate ion transport and improve ionic conductivity. Thus, this particular polymer electrolyte possesses both very good mechanical properties and good ionic conductivity.

An example of ionic conductivity as a function of temperature of several composition of polymer electrolyte (examples A-D represented in Table 1 above) is presented FIG. 3. As shown, ionic conductivity close to 1 mS/cm can be achieved at room temperature which is considered high for a solid electrolyte. By way of comparison glass-ceramic electrolytes have ionic conductivity in the range of $10^{-5}$ to $10^{-4}$ S/cm and PEO based electrolytes have conductivity in the range of $10^{-5}$ S/cm.

Still, the conductivity remains about one order of magnitude lower than typical liquid electrolyte such as conventional 1M lithium hexafluorophosphate in ethylene carbonate/dimethyl carbonate (1M LiPF6 in EC/DMC). Together with the selected battery architecture and optional Si/S chemistry, secondary batteries with very good performance (e.g., as elaborated upon below).

The 3D architecture allows for short ion transport lengths between the active material(s) through the electrolyte. Example distances (per below) result in fast ion transport from anode to cathode and vice versa. Considering a 3D Si/Li$_2$S battery architecture with 500 µm high VACNTs configured in various interlaced electrode "finger" widths with electrolytes of different conductivities (i.e., 1 mS/cm with the subject polymer electrolyte and 10 mS/cm with 1M LiPF6 liquid electrolyte), the following values were modeled:

TABLE 2

| Finger Width (µm) | Electrolyte | Power Density (W/L) | Energy Density (Wh/L) |
|---|---|---|---|
| 25 | 1 mS/cm | 17600 | 740 |
|  | 10 mS/cm | 176000 |  |
| 50 | 1 mS/cm | 6780 | 910 |
|  | 10 mS/cm | 67800 |  |
| 200 | 1 mS/cm | 630 | 1100 |
|  | 10 mS/cm | 6300 |  |

Alternatively, considering a 2D Si/Li$_2$S battery architecture (i.e., with facing electrode planes) of given thickness with the respective solid electrolyte options, the following values were modeled:

TABLE 3

| Electrode Thickness (µm) | Electrolyte | Power Density (W/L) | Energy Density (Wh/L) |
|---|---|---|---|
| 25 | 1 mS/cm | 2920 | 685 |
|  | 10 mS/cm | 29200 |  |
| 50 | 1 mS/cm | 1030 | 900 |
|  | 10 mS/cm | 10300 |  |
| 200 | 1 mS/cm | 89 | 1170 |
|  | 10 mS/cm | 890 |  |

In both cases, the values obtained were for models including an electrolyte thickness of 25 µm, with electrolyte thickness being the gap between fingers in the 3D case, and electrode thickness being equal to height of the CNT represented in Table 3 in the case of the 2D example.

Second Set of Embodiments 3D electrode architectures and processes for their fabrication are contemplated (though not necessarily) for use in connection with the solid electrolytes described above. Electrode arrangement is one of the key considerations in making a battery. Whereas current Li-ion batteries with 2D geometries need large footprint areas to achieve large capacities, 3D battery architectures have the advantage of using the out-of-plane dimension. This can increase the areal capacity by increasing the amount of electrode material within a given footprint area. It may also improve electrochemical properties by allowing for more accessible surfaces with shorter ion diffusion distances.

Figure 4:
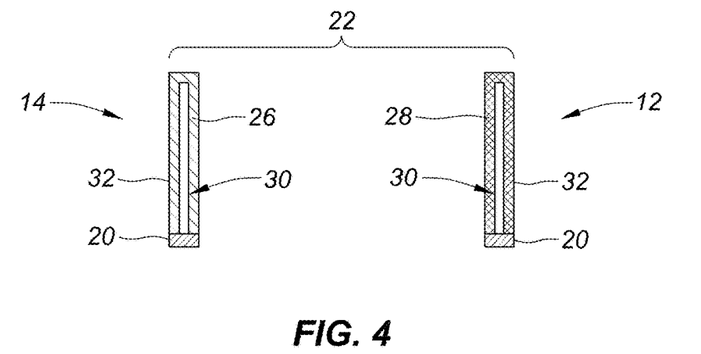
FIG. 4 is a detail side cross-section view of electrodes (anode or cathode) construction applicable to various embodiments hereof.

Example electrode architectures are illustrated in FIG. 4. Silicon 26 and sulfur 28 may provide the active electrode material. VACNT structures 30 provide a scaffold and (optional) graphene enclosures 32, respectively. When employed in the configuration shown in FIGS. 1A-1C, this allows (e.g., silicon and sulfur) battery chemistry to expand and contract freely during the charging and discharging cycles.

Embodiments hereof include two new 3D battery fabrication processes for production with high aspect ratio electrode elements such as shown in FIGS. 1A-1C and 4. By "high aspect ratio," what is meant is between 2 and about 25 in which maximum VACNT height may be about 500 µm with width of given fingers from about 25 to about 200 µm.

The subject processes allow separated and independent preparation of each electrode. This is advantageous because the incorporation of the different anode and cathode active materials into each VACNT arrays involves different approaches.

In both processes, cathode and anode structures are patterned in a specific structure allowing the electrodes to be interdigitated with alternating anode and cathode. Examples of this configuration are presented FIGS. 1A-1C and 5-7.

When assembled, the electrodes are in the same plane (optionally, along with their substrate support surfaces) but situated without touching each other. The electrodes have sufficient channel space or gap 22 between them as shown in FIGS. 1C and 4 to accommodate the stress and strain induced by volume change during charge-discharge cycles (i.e., even with a Si/S chemistry) while high power density may be achieved by maintaining short electron and ion transport lengths in the active material (typically, less than 100 µm) and in the electrolyte (typically, less than 100 µm and preferably down to about 30 µm).

In these embodiments, the shape of the included current collector dictates the shape of both cathode and anode. The fabrication process may start by separating the current collectors, machining them from a single piece of material. Contact-free high speed laser or electric discharge machining (EDM) techniques may be used to make a precise electrodes. Alternatively, individual (vs. paired) pieces may be machined.

Figure 5:
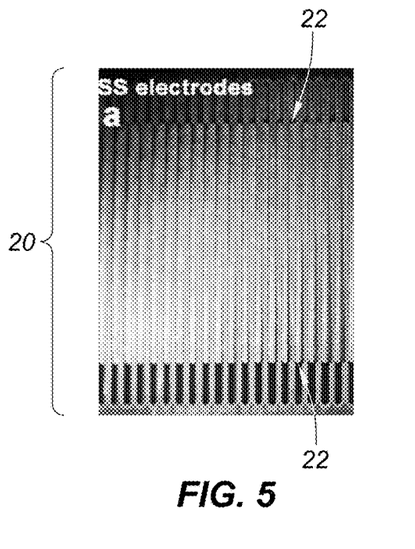
FIG. 5 is an optical microscope view of electrode elements.

As shown in FIG. 5, Stainless Steel (SS) coated with Nickel (Ni) and catalyst (not shown) may be used as current collector(s) 20 in an assembled battery structure. In this example, each current collector "finger" element is 1.44 cm length and 335 μm width and configured for a channel 22 between interleaved portions of about 30 μm.

Notably, the Nickel (Ni), if desired for catalytic properties or otherwise, can be deposited on the stainless steel (using well-known microfabrication techniques such as lithography, physical vapor deposition (PVD) or electroplating) before or after cutting. With the addition of a catalyst, VACNT scaffolds (not shown in FIG. 5) are then directly grown on the patterned current collector by CVD deposition technique. Si and S (or Li2S) may be incorporated separately into VACNT scaffold on each electrode. Then graphene (or graphene and PLA composite) may be used to wrap or coat Si/VACNT and S/VACNT (or Li2S/VACNT). Notably, the use of VACNT scaffolds allow the use of very thick films of silicon and sulfur active materials (e.g., up to several mm), without escalating their internal electrical resistance or affecting power density.

For electrical insulation between the current collector portions upon assembly, micro-structure polymer element(s) may be used. Photolithography techniques may be used to fabricate a micro-structured "mold" using epoxy-based photoresist (e.g., SU-8/2002/2100 or SU-8/2002/2150). This element will be used to separate the anode and cathode (e.g., fitting into the example 30 μm channel or gap referenced above). The photolithography process, used for photoresist patterning generally includes spin coating, soft bake, near UV exposure, development, and post-bake.

The SU-8 microstructure may be formed on a glass or silicon oxide substrate or any type of non-conductive substrate. For good adhesion to substrate and an overall high aspect ratio microstructure (e.g. on the order of about 5 to about 25) SU-8/2002 may be used as a base layer followed by application of SU-8 2100 or 2150.

Figure 6:
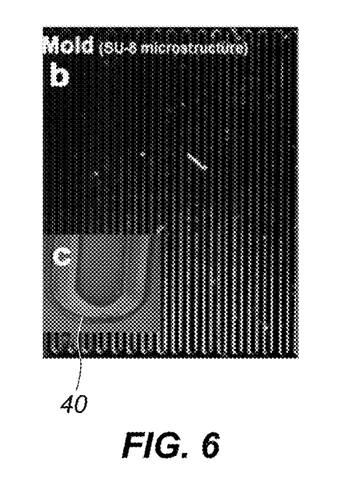
FIG. 6 is an optical microscope view with an inset detail at higher magnification of a micro-structure insulation element.
Figure 7:
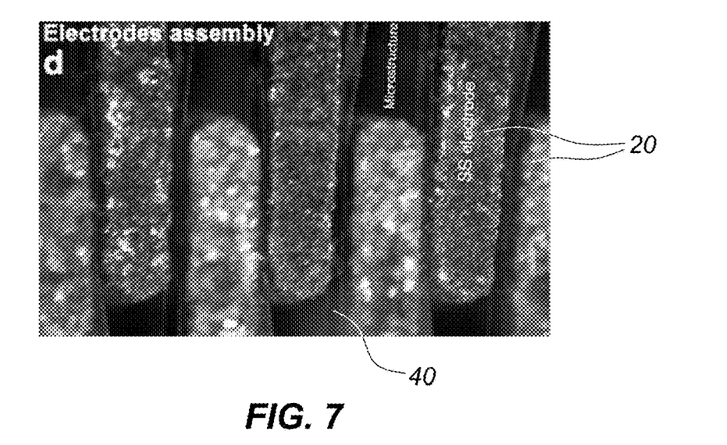
FIG. 7 is an optical microscope view showing an assembly of the elements in FIGS. 5 and 6.

FIG. 6 shows a SU-8 micro-structure element 40 on a silicon oxide wafer made by lithography technique. The width of each "line" to fit in gap 22 is 10 μm and the overall thickness is about 250 μm. This thickness is coordinated with current collector 20 thickness of about 25 μm to about 250 μm. In other words, one placed or emplaced as shown in FIG. 7, the microstructure element or elements insulate the electrode substrates or current collectors from electrical shorting as typically matching the thickness of the stainless steel current collector. Moreover, the polymer micro-structure or micro-structured element 40 separate the base of the electrode, alone. Above their mutual (planar) surface electrolyte separates the VACNTs 30 and associated active material 26, 28 and/or encasing 32. Electrical resistance of the SU-8 material element 40 example is $2.8 \times 10^{16}$ Ω·cm.

Figure 8:
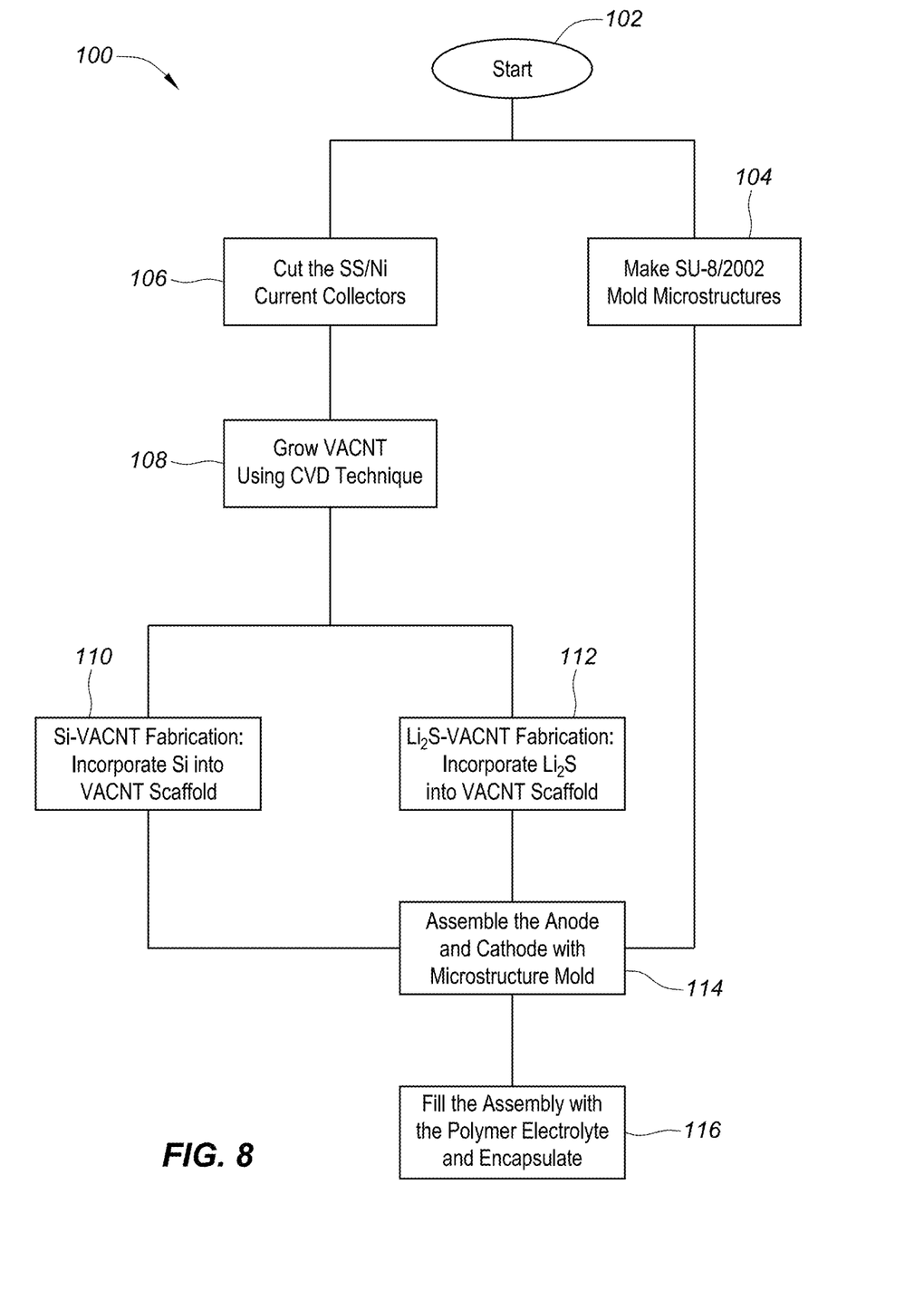
FIG. 8 is a flowchart detailing manufacture methods of an embodiment including components as described in connection with FIGS. 5-7.

FIG. 8 details processes in connection with the above. The process 100 begins at 102. Along one line of action, at 104, the mold micro-structure element(s) reference above are made.

Along the other line, the current collector portions are cut at 106, optionally as described above. At 108, VACNTs are grown on the substrate or current collector electrode portions.

For the anode "side" or part of a battery, Si may be incorporated in the CNT scaffold at 110. For the cathode side, Li2S may be incorporated in its CNTs at 112.

At 114, the anode and the cathode are assembled together with the micro-structure "mold" element(s). At 116, this subassembly is filled with polymer electrolyte as described above (or otherwise) and/or be encapsulated therewith. Although not illustrated, a housing and various electrical connections can then be applied (e.g., as illustrated in connection with FIGS. 1A and 1B).

Figure 9A:
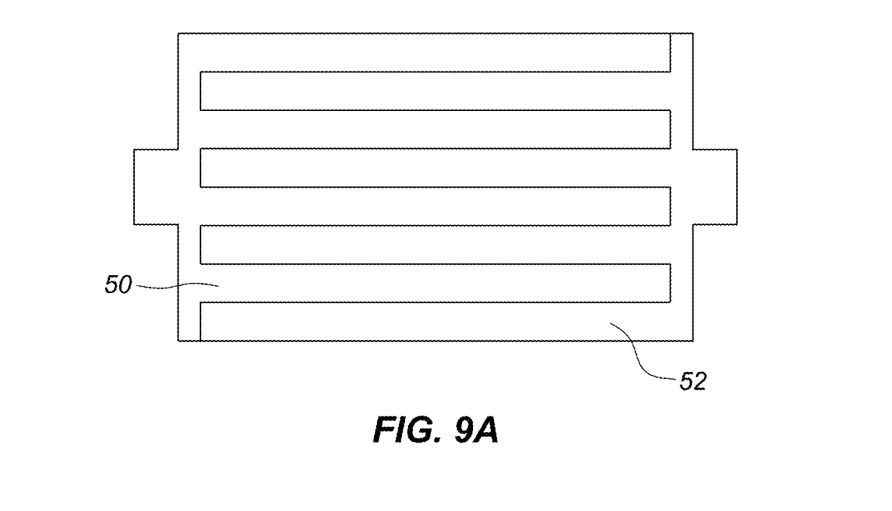
FIGS. 9A and 9B are top views of ceramic substrates before and after nickel current collector deposition thereon, respectively.
Figure 9B:
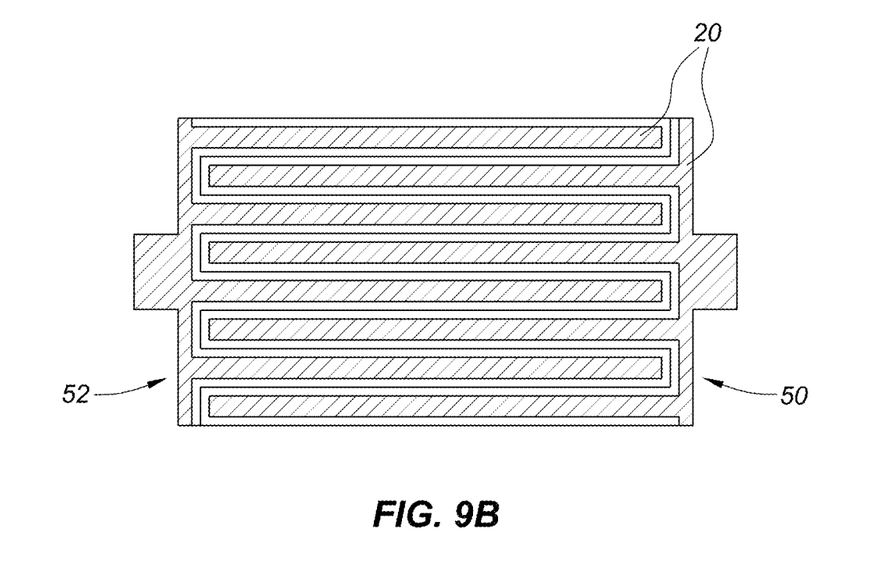

In another example of this set of embodiments, the fabrication process involves cutting a ceramic (e.g., $Al_2O_3$) substrate with a defined pattern (e.g., in the aforementioned "comb" or "brush" shape) by laser cutting or otherwise. Such an approach is illustrated in FIG. 9A with the ceramic substrate pieces 50, 52 inserted into each other. FIG. 9B shows two pieces of ceramic substrate after nickel current collector 20 material deposition. Use of the ceramic or a non-conductive polymer such as polydimethylsiloxane (PDMS) as a substrate offers the following potential advantages including: 1) dimensional stability, 2) resistance to warping from cutting, 3) the ability to achieve finer feature resolution and/or 4) no heat-effected zone.

Again, VACNT scaffolds can then be grown on the patterned current collector(s) by CVD deposition technique. Si and Li$_2$S can also be incorporated separately into VACNT scaffolds on each side of cut electrodes. Then, graphene may be used to wrap or cote the VACNTs. Finally, as above, the electrodes (cathode and anode) are inserted into each other.

Figure 10:
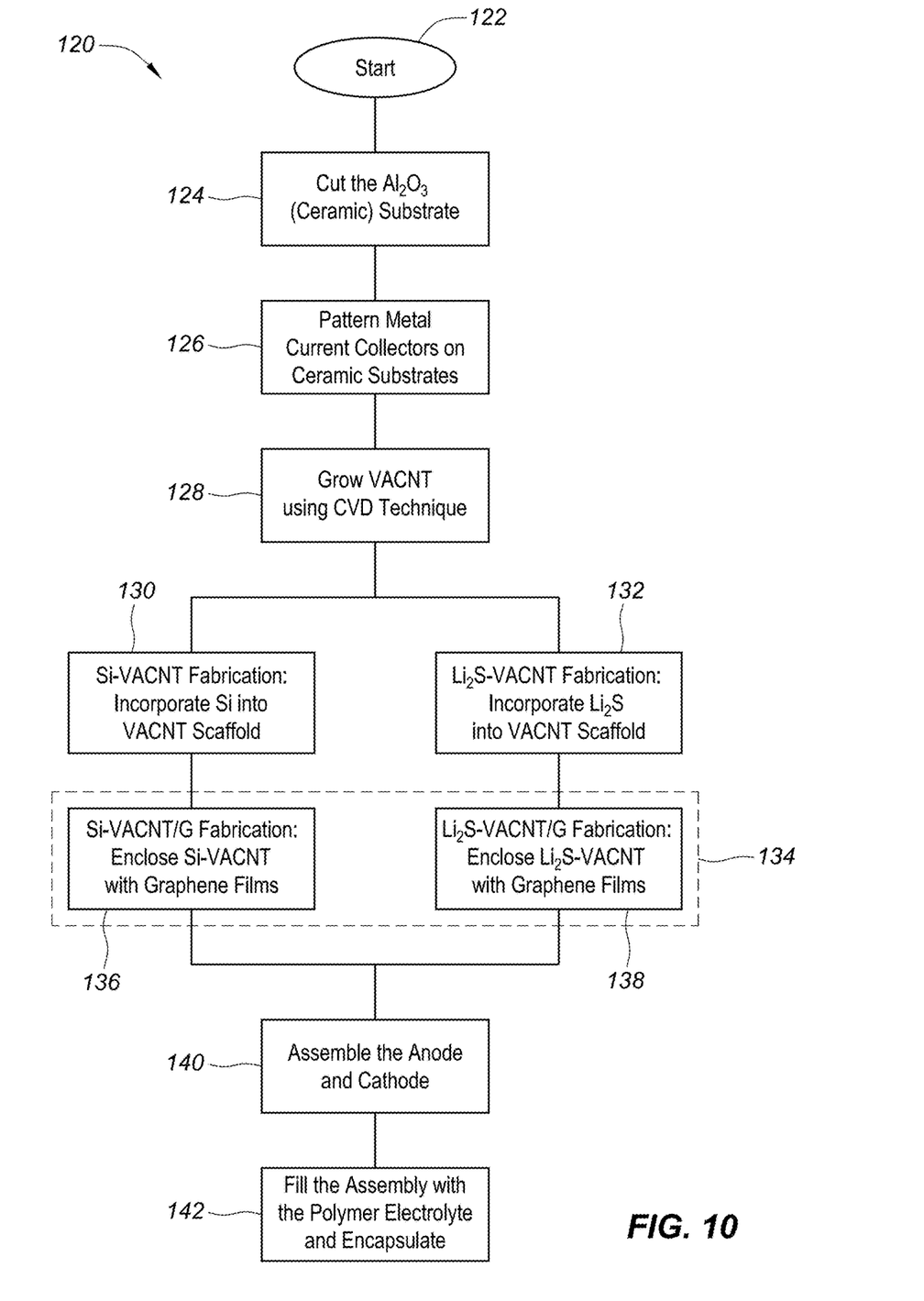
FIG. 10 is a flowchart detailing manufacture methods of an embodiment including components as described in connection with FIGS. 9A and 9B.

In more detail per FIG. 10, once process 120 starts at 122, it involves cutting the ceramic substrate at 124. The substrate is then coated or patterned with metal (e.g., Nickel). At 128, VACNTs are grown upon the patterned metal that will serve as a current collector over the ceramic substrate.

Active material is incorporated in the VACNTs at 130 and 132, as above. Optionally, at 134, the loaded VACNTs may be enclosed in a graphene film at 336 and 138.

The anode and cathode are then assembled (without the need for a separating micro-structure mold) at 140 and filled with (optionally) polymer electrolyte at 142. Per above, the polymer electrolyte may then be cured. Moreover, the electrodes may be encapsulated, as above, and/or other final battery manufacture acts or steps completed such as encasing the structure, etc.

Third Set of Embodiments

A third set of embodiments involves producing a stable SEI pre-formed on a silicon anode (e.g., as in coating 32 on anode 14 in FIG. 4) using poly(ethylene)oxide bis(azide) (PEO-N3) polymer. A thin (e.g., between about 2 nm and 100 nm) protective layer on the silicon surface 26 so-produced contributes to high performance and good cyclability lithium ion batteries (e.g., a maintaining a capacity of 80% of the theoretical value has been obtained over 10 cycles).

After application (e.g., as further described below) and curing, the azide functional groups of the polymer are converted to highly reactive nitrene radicals, resulting in the crosslinking of the polymer and in a significant increase of its mechanical properties. These mechanical properties can be enhanced by incorporating into the polymer matrix a small amount (e.g., about 1 to about 2% by weight of the overall composition) of graphene, ionic liquids, or small organic molecules. Thus, the polymer layer can help to accommodate volume change of the silicon electrode (i.e., it buffers stress and strain of electrodes).

Another important feature of azide groups is their abilities to bond to silicon surfaces when they undergo UV irradiation. This feature protects the silicon surface and prevents further decomposition of the electrolyte each cycle. Together, these features or aspects provide a polymer layer forming a stable SEI during cycling of the silicon anode. The subject polymer also provides high lithium ion conductivity (e.g., about 1 mS/cm). Notably, poly(ethylene)oxide-based polymers are widely used in solid-state lithium ion batteries because of their well-known high ionic conductivity.

Accordingly, while the polymer layer protect the silicon surface, it also allow lithium ion transport to and from the anode material.

Figure 11:
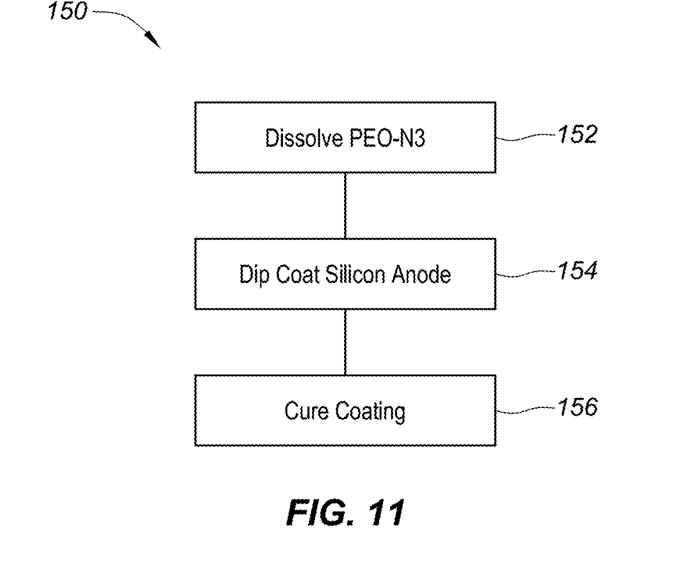
FIG. 11 is a flowchart detailing SEI production or manufacture with PEO-N3 in another embodiment.

A process 150 for forming the polymer layer may be accomplished as illustrated in FIG. 11 without applying high temperature (e.g., about 80° C. or less). Specifically, at 152, PEO-N3 is dissolved in an organic solution. Then, at 154 silicon anode is dip coated into the PEO-N3 solution. At 156, the thin (e.g., between about 10 µm to 100 µm, more preferably 10 µm to 20 µm) polymer layer is subsequently cured. UV light, convective heat (e.g. at about 250° C.) or microwave may be used for curing.

Fourth Set of Embodiments

In yet another set of embodiments, a so-called "polysulfide trap" is produced for lithium-sulfur batteries. An example lithium sulfur cell includes a lithium-containing anode, a cathode and a separator between the lithium-containing anode and the sulfur-containing cathode. To prevent a loss of active material and stop the migration of polysulfides to the anode side, the sulfur active material 28 electrode (cathode) 12 is (at least partially) covered with a graphene and thermoplastic polymer (e.g., poly(lactic acid) (PLA)) composite layer 32 as in FIG. 4. The graphene and PLA composite layer shows effective lithium polysulfide traps to prevent the shuttle mechanism (i.e., dissolution of lithium polysulfides in the electrolyte) that would otherwise occur in the battery. Previous problems resulting in poor cycle life, low specific capacity and low energy efficiency in sulfur batteries are addressed with a cathode comprising a composite of sulfur and VACNTs coated or covered with the graphene and PLA composite. The VACNTs are employed to enhance the conductivity of S-based cathodes whereas the graphene and PLA composite assists or altogether prevents dissolution of polysulfides into the electrolytes and minimizes fracture of sulfur particles within the graphene and PLA enclosures. Stated otherwise, the graphene and PLA is an ideal trap for polysulfide due to flexible structure of graphene sheets. Likewise, the graphene sheets may contribute to PLA chain confinement effects leading to improvement in stiffness and strength.

Figure 12:
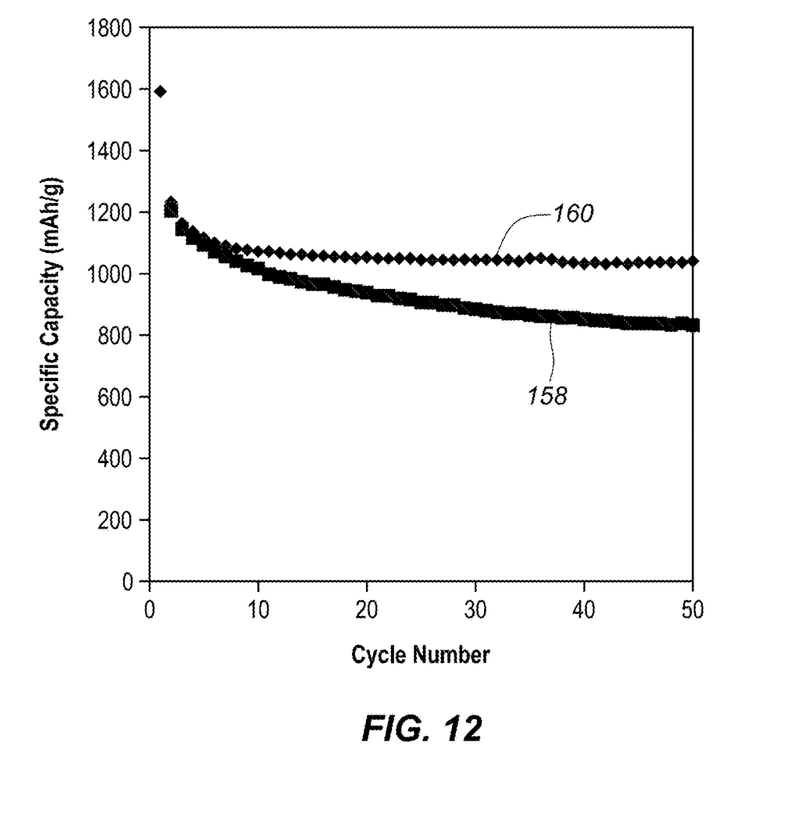
FIG. 12 is a graph of illustrating cycling of performance of a S-VACNT electrode with and without a G/PLA trap.

During the charge-discharge cycles, the graphene and PLA composite enclosures prevent a direct contact between electrolyte and polysulfides formed in the VACNTs. Thus, dissolution of polysulfides into the electrolyte can be avoided (as noted above) whilst simultaneously allowing electrochemical reaction to occur. This activity ultimately improves the battery cycle life, improves overall capacity and minimizes fading in capacity of the S-VACNT as seen in data with the G/PLA trap 160 versus without at 158 in FIG. 12. Clearly, a much higher initial capacity and overall capacity is observed, with no appreciable decay observed after 10 cycles when a G/PLA trap is applied. In addition, the graphene enclosures also reduce internal resistance of the VACNTs to ultimately improve the overall battery efficiency.

Figure 13A:
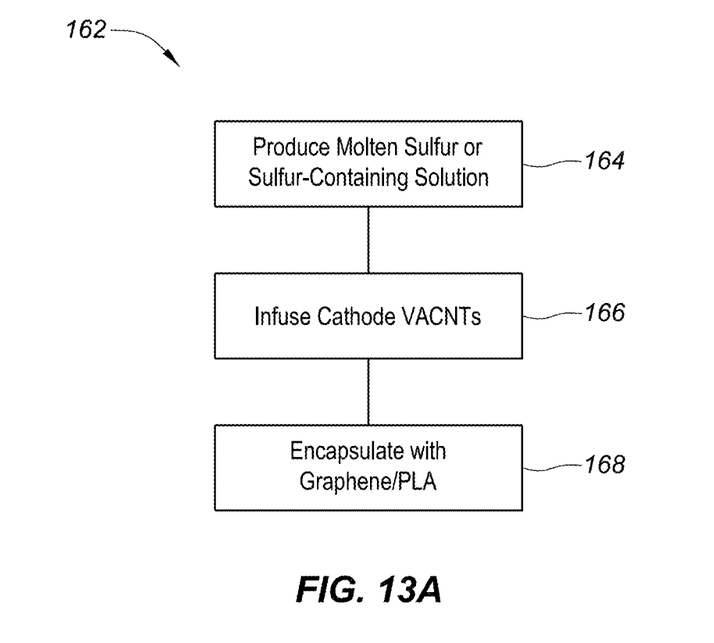
FIGS. 13A and 13B are flowcharts detailing polysulfide trap type cathode and anode production, respectively, with a graphene PLA composite.

FIG. 13A illustrates a process 162 for such cathode preparation. At 164, molten sulfur and sulfur containing solutions are prepared. They are used, at 166, to infuse sulfur via melting from above and flowing into the VACNT interstices while allowing some inter-space between the coated CNTs so that electrolyte can pass through). As sulfur has a very good affinity with carbon, the CNT are easily coated, allowing each individual CNT to be coated. A successful sulfur infusion process results in a change of between about 300% to about 350% by weight of the VACNT structure (or a ratio of sulfur to VACNT of about 60%). Once the VACNT scaffolds are infused by sulfur, the grapheme and PLA composite encapsulates the VACNTs at 168 (via dipping, spin coating or otherwise).

Different concentration of graphene and PLA solution are obtained by dissolving the graphene and PLA pellets or wire into chlorinated solvent, typically, with a goal of obtaining a G/PLA coating with 1% to 10% by weight of Si. The graphene and PLA solution is deposited on the VACNT/S electrodes by spin coating, drop casting or spraying coating methods.

The same method may be used in preparing the battery anode. In such embodiments, the coating 32 for each of the anode 14 and cathode 12 described with respect to FIG. 4 includes the graphene and PLA composite. In one particular example embodiment, that coating 32 includes only the graphene and PLA composite and no other material. Hybridizing a Si-VACNT anode with graphene and PLA provides a solution for utilizing the high theoretical capacity of Si while avoiding structural damage due to the extremely large volume change.

Figure 13B:
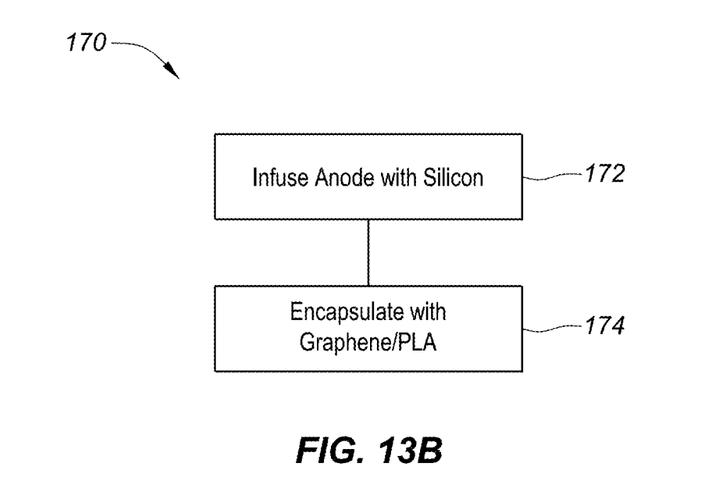

Such a coating may be applied over a stable SEI layer formed per above. Except in this case, in process 170 of FIG. 13B, Silicone is incorporated in the anode, at 172, by CVD or another technique. Then the Si-VACNT cathode is encapsulated with the graphene and PLA composite at 174.

Embodiment Variations

The subject methods, including methods of use and/or manufacture, may be carried out in any order of the events which is logically possible, as well as any recited order of events. Furthermore, where a range of values is provided, it is understood that every intervening value, between the upper and lower limit of that range and any other stated or intervening value in the stated range is encompassed within the invention. Also, it is contemplated that any optional feature of the inventive embodiments or variations described may be set forth and claimed independently, or in combination with any one or more of the features described herein.

Though the invention has been described in reference to several examples, optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention.

Reference to a singular item includes the possibility of a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the claims below.

Likewise, use of the term "comprising" in the claims shall allow for the inclusion of any additional element—irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity. In any case, the breadth of the different inventive embodiments or aspects described herein is not to be limited to the examples provided and/or the subject specification, but rather only by the scope of the issued claim language.

The invention claimed is:

1. A method of electrochemical cell layer manufacture, the method comprising:
   forming an anode comprising a first current collector supporting anode carbon nanotubes, wherein the anode carbon nanotubes extend vertically from the first current collector in a direction perpendicular to a plane formed by the first current collector, and wherein the anode carbon nanotubes have an anode active material deposited thereon;
   forming a cathode comprising a second current collector supporting cathode carbon nanotubes, wherein the cathode carbon nanotubes extend vertically from the second current collector in a direction perpendicular to a plane formed by the second current collector, and wherein the cathode carbon nanotubes have a cathode active material deposited thereon;
   forming a solid polymer insulator configured to closely fit between the first and second current collectors; and
   assembling the first current collector, second current collector, and solid polymer insulator into a close-fit relationship to form a planar surface, and
   wherein the solid polymer insulator only separates the first and second current collectors.

2. The method of claim 1, wherein the solid polymer insulator is formed by photo lithography.

3. The method of claim 1, further comprising filling between the anode and cathode carbon nanotubes with a polymer electrolyte paste.

4. The method of claim 3, further comprising curing the polymer electrolyte paste to a solid state.

5. The method of claim 3, further comprising filling between the anode and cathode carbon nanotubes after the assembling.

6. The method of claim 3, wherein the polymer electrolyte comprises functionalized poly(ethylene glycol), a lithium salt, an ionic liquid, and graphene oxide.

7. The method of claim 1, wherein the solid polymer insulator is fit within a gap of about 30 μm between portions of the first and second current collectors.

8. The method of claim 1, wherein the first current collector and the second current collector are each patterned in a comb-type configuration comprising at least two teeth, wherein the first current collector and second current collector are in a same plane, and further comprising the step of assembling the first and second current collectors in an interlaced assembly pattern.

9. The method of claim 8, wherein at least one gap is formed between a tooth of the first current collector and an adjacent tooth of the second current collector in the interlaced assembly pattern, and wherein the solid polymer insulator is placed in the at least one gap.

* * * * *